US007721829B2

(12) United States Patent
Lee et al.

(10) Patent No.: US 7,721,829 B2
(45) Date of Patent: May 25, 2010

(54) TRAVELING ROBOT

(75) Inventors: Youn-baek Lee, Suwon-si (KR);
Soo-sang Yang, Suwon-si (KR);
Yong-jae Kim, Seoul (KR); Yeon-taek Oh, Yongin-si (KR); Jeong-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 11/601,706

(22) Filed: Nov. 20, 2006

(65) Prior Publication Data
US 2007/0119635 A1 May 31, 2007

(30) Foreign Application Priority Data
Nov. 29, 2005 (KR) ...................... 10-2005-0114918
May 4, 2006 (KR) ...................... 10-2006-0040566

(51) Int. Cl.
*B62D 11/02* (2006.01)
(52) U.S. Cl. ........................ 180/6.48; 180/6.28; 180/6.5
(58) Field of Classification Search .................. 180/6.5, 180/6.48, 6.28; 280/124.125, 124.179
See application file for complete search history.

(56) References Cited
U.S. PATENT DOCUMENTS

| 4,515,235 | A | * | 5/1985 | Yamamoto et al. | 180/168 |
| 4,572,311 | A | * | 2/1986 | Oswald et al. | 180/6.48 |
| 5,350,033 | A | * | 9/1994 | Kraft | 180/167 |
| 6,357,076 | B1 | * | 3/2002 | Lee | 15/354 |
| 7,213,663 | B2 | * | 5/2007 | Kim | 180/6.5 |
| 2002/0153184 | A1 | * | 10/2002 | Song et al. | 180/167 |

(Continued)

FOREIGN PATENT DOCUMENTS
EP 402764 B1 1/1996

(Continued)

OTHER PUBLICATIONS
Korean Office Action dated May 7, 2007 issued in KR 2006-0040566.

*Primary Examiner*—Lesley Morris
*Assistant Examiner*—Tashiana Adams
(74) *Attorney, Agent, or Firm*—Stanzione & Kim, LLP

(57) ABSTRACT

A traveling robot includes a main body frame having a front wheel supported in a front portion thereof in a traveling direction, a first traveling part having a first driving wheel to drive in the traveling direction, a first rear wheel disposed in a rear side of the first driving wheel, and a first wheel frame to support the first driving wheel and the first rear wheel, a second traveling part having a second driving wheel to drive in the traveling direction independently from the first driving wheel, a second rear wheel disposed in a rear side of the second driving wheel, and a second wheel frame to support the second driving wheel and the second rear wheel, a first interlocking hinge part to rotatably support the first wheel frame to the main body frame to have a hinge axis of a perpendicular direction with respect to the traveling direction, and a second interlocking hinge part to rotatably support the second wheel frame to the main body frame independently from the first interlocking hinge part to have a hinge axis of the same direction as the first interlocking hinge part.

16 Claims, 17 Drawing Sheets

U.S. PATENT DOCUMENTS

| | | | |
|---|---|---|---|
| 2003/0028993 A1* | 2/2003 | Song et al. | 15/319 |
| 2004/0195012 A1* | 10/2004 | Song et al. | 180/6.5 |
| 2004/0262060 A1* | 12/2004 | Kim | 180/65.5 |
| 2007/0137905 A1* | 6/2007 | Lee et al. | 180/21 |

FOREIGN PATENT DOCUMENTS

| | | |
|---|---|---|
| JP | 57-186589 | 11/1982 |
| JP | 2000-202792 | 7/2000 |
| JP | 2000-279353 | 10/2000 |
| KR | 2004-8373 | 1/2004 |
| KR | 2004-87185 | 10/2004 |
| KR | 2004-96253 | 11/2004 |
| KR | 2005-3112 | 1/2005 |
| KR | 2005-15018 | 2/2005 |

* cited by examiner

TRAVELING ROBOT

CROSS-REFERENCE TO RELATED APPLICATIONS

This application claims priority under 35 U.S.C. §119 (a) from Korean Patent Application Nos. 2005-0114918, filed on Nov. 29, 2005, and 2006-0040566, filed on May 4, 2006 in the Korean Intellectual Property Office, the disclosures of which are incorporated herein by reference in their entirety.

BACKGROUND OF THE INVENTION

1. Field of the Invention

The present general inventive concept relates to a traveling robot, and more particularly, to a traveling robot having an enhanced traveling ability to travel along an uneven surface.

2. Description of the Related Art

Generally, a robot performs dangerous, simple, repetitional, precise, large scale or great amount of works for a human. The robot is widely used in industrial, military, domestic or other fields. A traveling apparatus is essential to the robot which should move to perform a work. Thus, technologies have been being developed for the traveling apparatus of the robot, and especially, for the traveling apparatus allowing the robot to smoothly travel in the horizontal state, and thereby minimizing shaking of the robot on an uneven surface such as a traveling surface having a stair.

FIGS. 1A to 1C schematically illustrate traveling states of a conventional traveling robot. As illustrated in FIGS. 1A to 1C, a traveling robot 101 includes a housing 110, a rear wheel 130 and a traveling part 120, and travels on a traveling surface S. The rear wheel 130 is disposed in a rear side of the housing 110 in a traveling direction "d". The rear wheel 130 rotates idly and supports the housing 110 to the traveling surface S.

The traveling part 120 includes a frame 122, two driving wheels 124, and a front wheel 126. The frame 122 is rotatably coupled with the housing 110 by a hinge part 112. The two driving wheels 124 are disposed respectively in opposite sides of the frame 122. The driving wheel 124 receives a driving force from a driving motor 124a and moves the housing 110 in the traveling direction "d." The front wheel 126 is supported by a front side of the frame 122. The front wheel 126 is disposed to rotate idly and supports the housing 110 to the traveling surface S. Thus, the frame 122 rotates about a center of the hinge part 112 with respect to the housing 110, and accordingly, the driving wheel 124 and the front wheel 126 move together with the frame 122. A conventional traveling robot is disclosed in U.S. Pat. No. 5,350,033.

However, a traveling ability of the traveling robot 101 is decreased when the traveling robot 101 travels on a traveling surface S having an obstacle O such as a stair. As illustrated in FIG. 1A, when the traveling robot 101 crosses the obstacle O, the front wheel 126 climbs on the obstacle O. At this time, the frame 122 rotates about a center of the hinge part 112 in a direction "a." Accordingly, the housing 110 may maintain the horizontal state.

As illustrated in FIG. 1B, when the traveling robot 101 further travels in the traveling direction "d." the driving wheel 124 climbs on the obstacle O, and the front wheel 126 is separated from the traveling surface S. A weight center of the traveling robot 101 moves backward to be disposed in the rear wheel 130. Accordingly, the driving wheel 124 cannot have a sufficient traction force to move the traveling robot 101 forward, and the driving wheel 124 slides the traveling surface S and accordingly, the traveling robot 101 can not cross the obstacle O smoothly.

In addition, as illustrated in FIG. 1C, when the traveling robot 101 more further travels in the traveling direction "d.", the driving wheel 124 crosses the obstacle O, and the rear wheel 130 climbs on the obstacle O. The weight center of the traveling robot 101 moves forward rapidly. Accordingly, the front wheel 126 separated from the traveling surface S may collide with the traveling surface S, the housing 110 shakes, and a position of the traveling robot 101 is changed to thereby cause traveling errors.

Especially, the traveling ability of the traveling robot 101 is further decreased when the opposite driving wheels 124 cross obstacles having different levels (heights) from the traveling surface S. Since the one front wheel 126 and the two driving wheels 124 are supported by the frame 122 to interlock each other, it is difficult for the opposite traveling wheels 124 to adapt to the different levels of the obstacles. Accordingly, the front wheel 126 becomes separated from the traveling surface S, and the sliding of the driving wheel 124 and the shaking of the housing 110 occur. Further, the traveling robot 101 unstably travels because its ability to be stuck to the traveling surface S is largely varied as the weight center of the traveling robot 101 moves.

SUMMARY OF THE INVENTION

The present general inventive concept provides a traveling robot having an enhanced traveling ability against an uneven surface.

The present general inventive concept provides a traveling robot improved in ability to be stuck on the ground.

The present general inventive concept provides a traveling robot which can protect its main body from a shock generated while climbing on a stair surface.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a traveling robot comprising a main body frame having a front wheel supported in a front portion thereof in a traveling direction, a first traveling part having a first driving wheel to drive the main body frame in the traveling direction, a first rear wheel disposed in a rear side of the first driving wheel, and a first wheel frame to support the first driving wheel and the first rear wheel, a second traveling part having a second driving wheel to drive the main body frame in the traveling direction independently from the first driving wheel, a second rear wheel disposed in a rear side of the second driving wheel, and a second wheel frame to support the second driving wheel and the second rear wheel, a first interlocking hinge part to rotatably support the first wheel frame to the main body frame to have a first hinge axis of a perpendicular direction with respect to the traveling direction, and a second interlocking hinge part to rotatably support the second wheel frame to the main body frame independently from the first interlocking hinge part to have a second hinge axis of the same direction as the first interlocking hinge part.

The first interlocking hinge part and the second interlocking hinge part may be disposed to the main body frame through the hinge axes and the hinge axes may be disposed on a same line.

The first traveling part and the second traveling part may be symmetrical with respect to the traveling direction.

The first interlocking hinge part and the second interlocking hinge part may be disposed within a predetermined distance from the weight center of the traveling robot in the traveling direction.

The first interlocking hinge part and the second interlocking hinge part may be disposed backward in the traveling direction from the weight center of the traveling robot.

The first wheel frame and the second wheel frame may include main frames to respectively support the first driving wheel and the second driving wheel, sub frames to respectively support the first rear wheel and the second rear wheel, and linking members to respectively I link the main frames with the sub frames.

The main frames may include driving shaft parts to respectively support the first driving wheel and the second driving wheel, frame bodies respectively extending upward and backward in the traveling direction from the driving shaft parts, and coupling parts respectively coupled with the linking members.

The foregoing and/or other aspects of the present general inventive concept may also be achieved by providing a traveling robot comprising a main body frame having a front wheel supported in a front portion thereof in a traveling direction, a plurality of drivers each of which comprises a driving wheel, a rear wheel disposed in a rear side of the driving wheel, and a wheel frame to connect and support the driving wheel and the rear wheel and driven independently from each other an interlocking hinge part to rotatably support the wheel frame of the respective drivers to the main body frame, and a suspension part provided between the main body frame and the wheel frame and allowing the driving wheel to be elastically biased toward a traveling surface.

The wheel frame may include a main frame to support the driving wheel, a sub frame to support the rear wheel, and a linking member to link the main frame with the sub frame, the interlocking hinge part may be provided between opposite end parts of the main frame, and the suspension part may be coupled to the main frame such that the driving wheel is disposed between the interlocking hinge part and the suspension part.

The suspension part may include an upper holder supported by a bracket cover provided in the main body frame, a lower holder rotatably supported by the main frame, an elastic member interposed between the upper and lower holders, and a guide shaft provided between the upper and lower holders along a stretching direction of the elastic member to prevent the elastic member from being bent.

The bracket cover may protrude from the main frame and is oppositely spaced apart from the lower holder at a predetermined distance.

The bracket cover may be provided in a wheel cover detachably coupled to the main frame.

The foregoing and/or other aspects of the present general inventive may also be achieved by providing a traveling robot including a main body frame having a front wheel formed at a front portion thereof, and having a shaft formed at a middle portion thereof, a main frame rotatably connected to the shaft, a driving wheel rotatably connected to a first end of the main frame, and a rear wheel connected to a second end of the main frame to be disposed at a rear portion of the main body frame.

BRIEF DESCRIPTION OF THE DRAWINGS

The above and/or other aspects and advantages of the prevent general invention concept will become apparent and more readily appreciated from the following description of the exemplary embodiments, taken in conjunction with the accompany drawings, in which.

DETAILED DESCRIPTION OF THE PREFERRED EMBODIMENTS

Figure 1A:
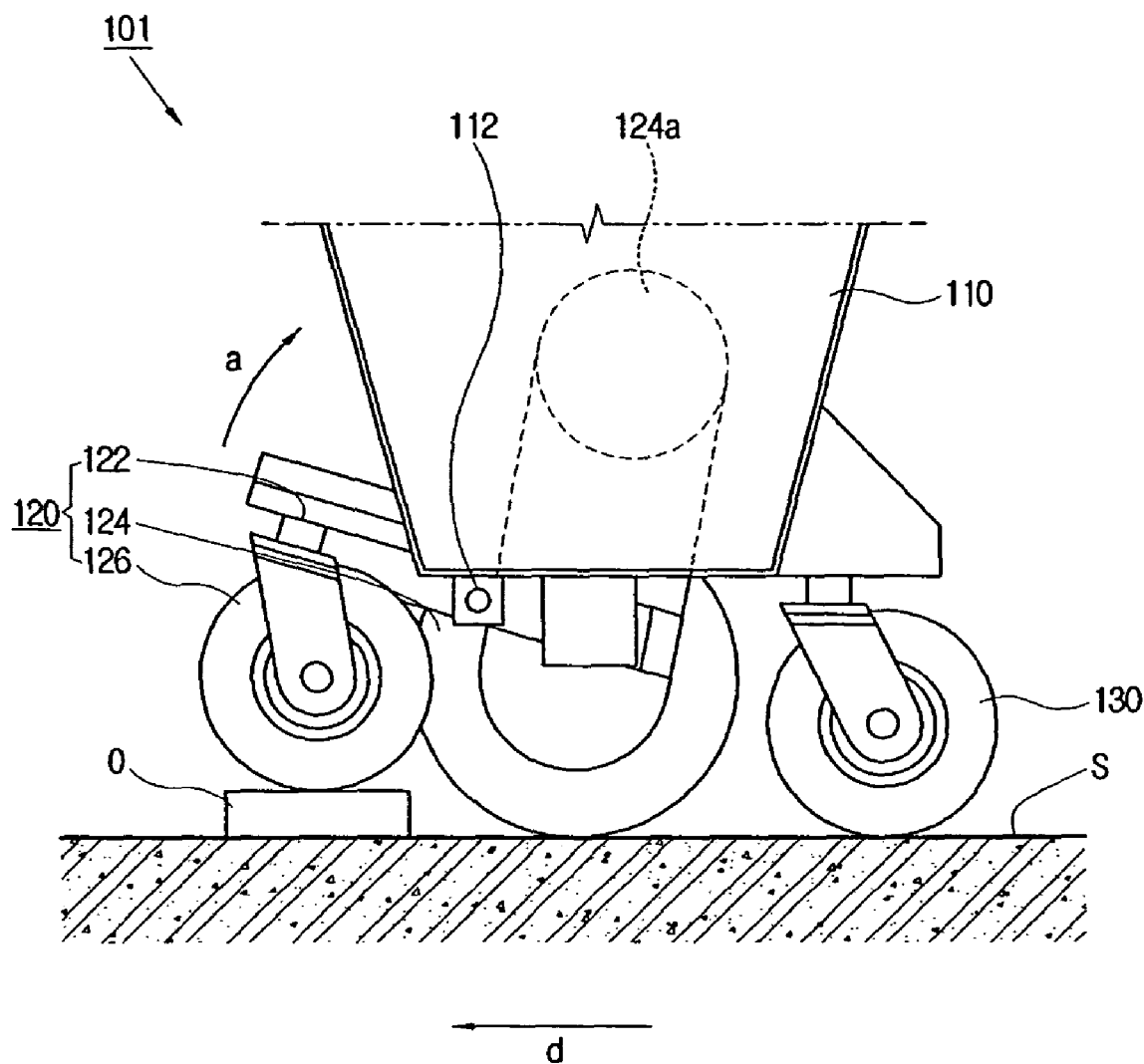
FIGS. 1A to 1C schematically illustrate traveling states of a conventional traveling robot.
Figure 1B:
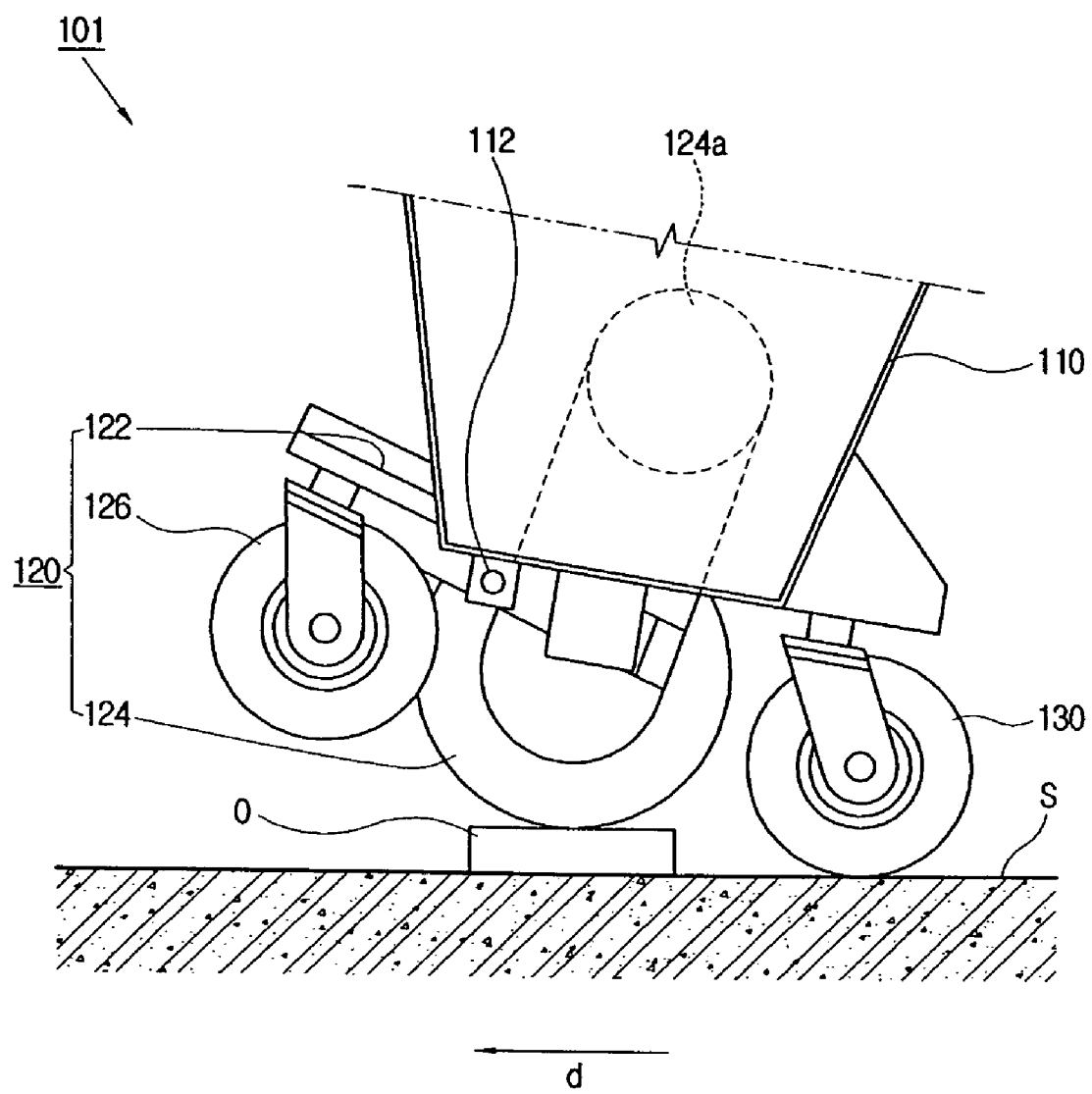
Figure 1C:
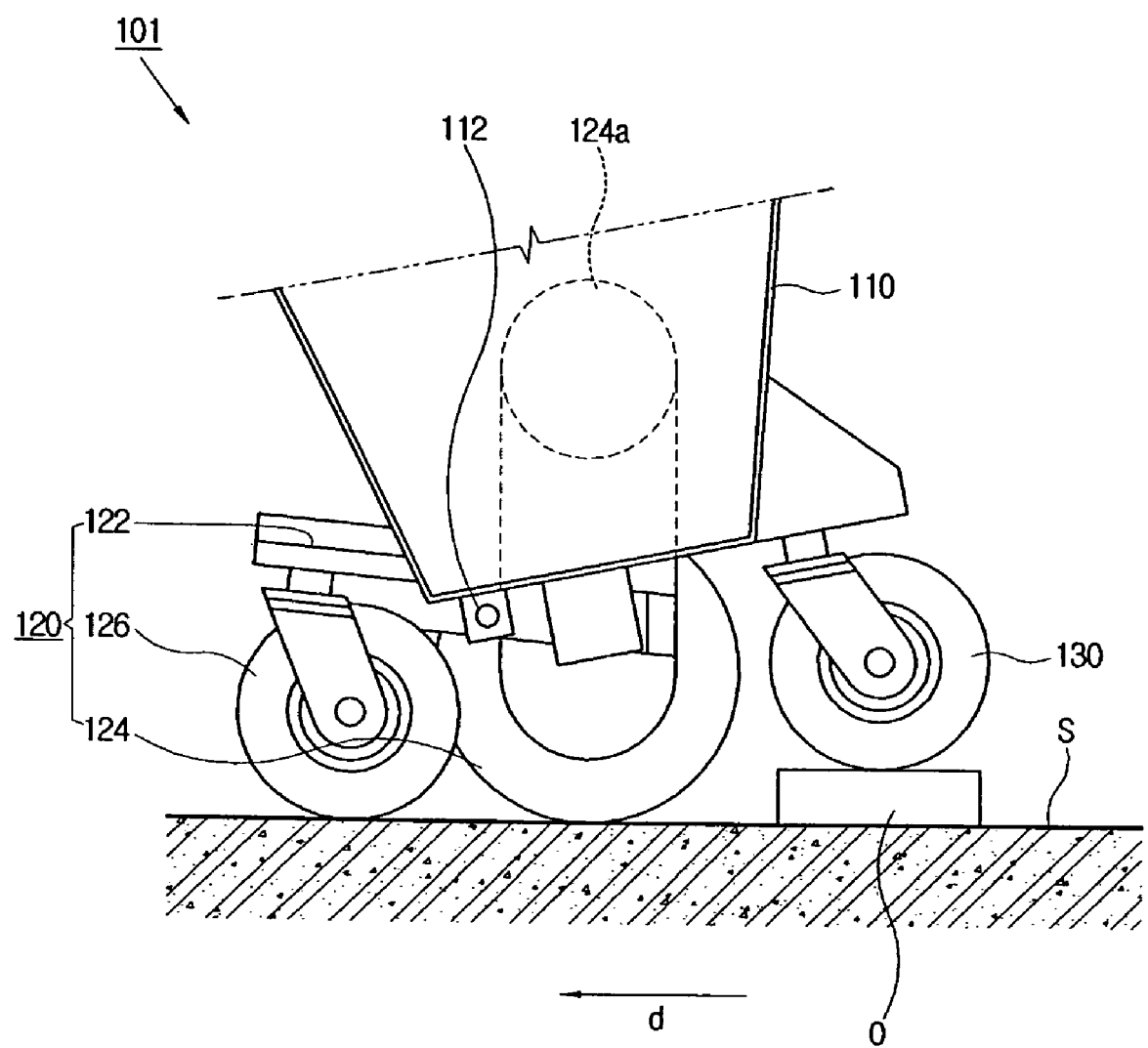

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 2:
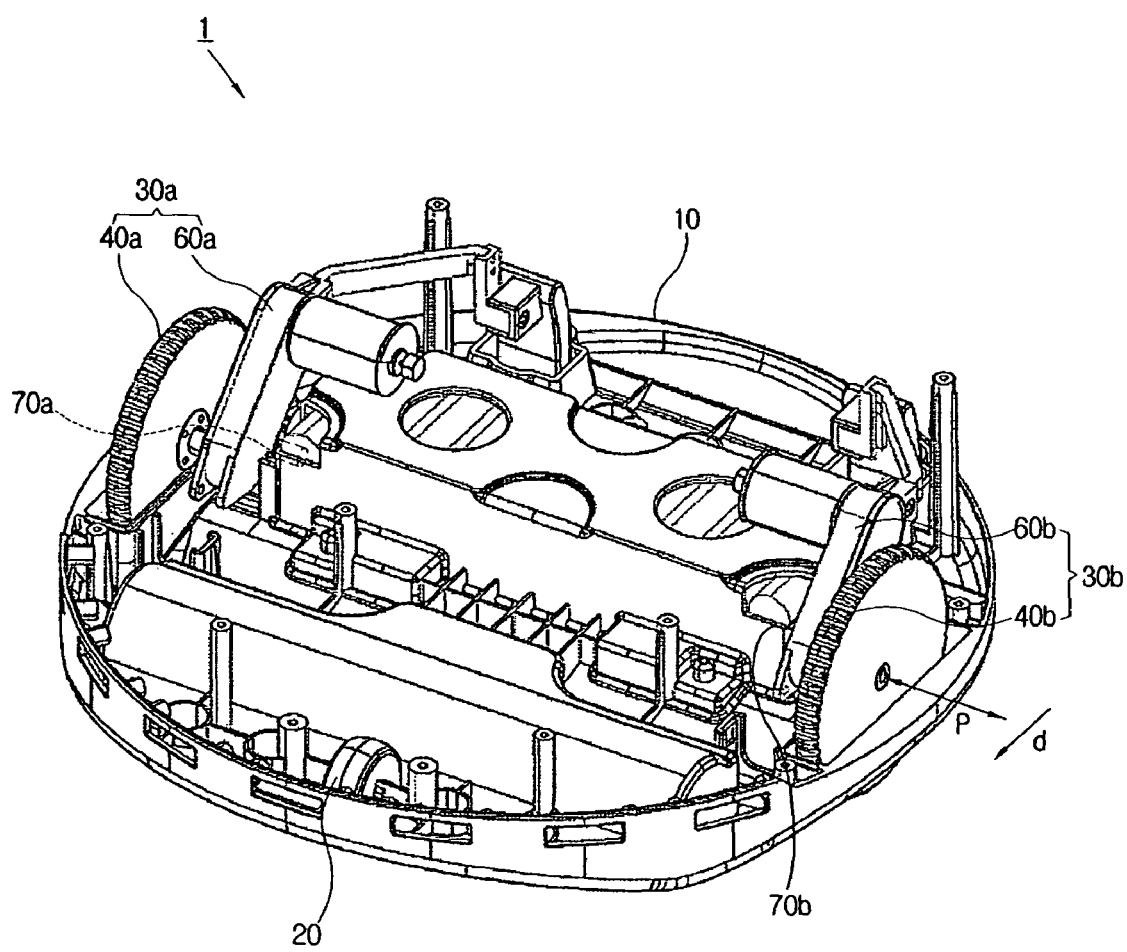
FIG. 2 is a perspective view illustrating a traveling robot according to an embodiment of the present general invention concept
Figure 3:
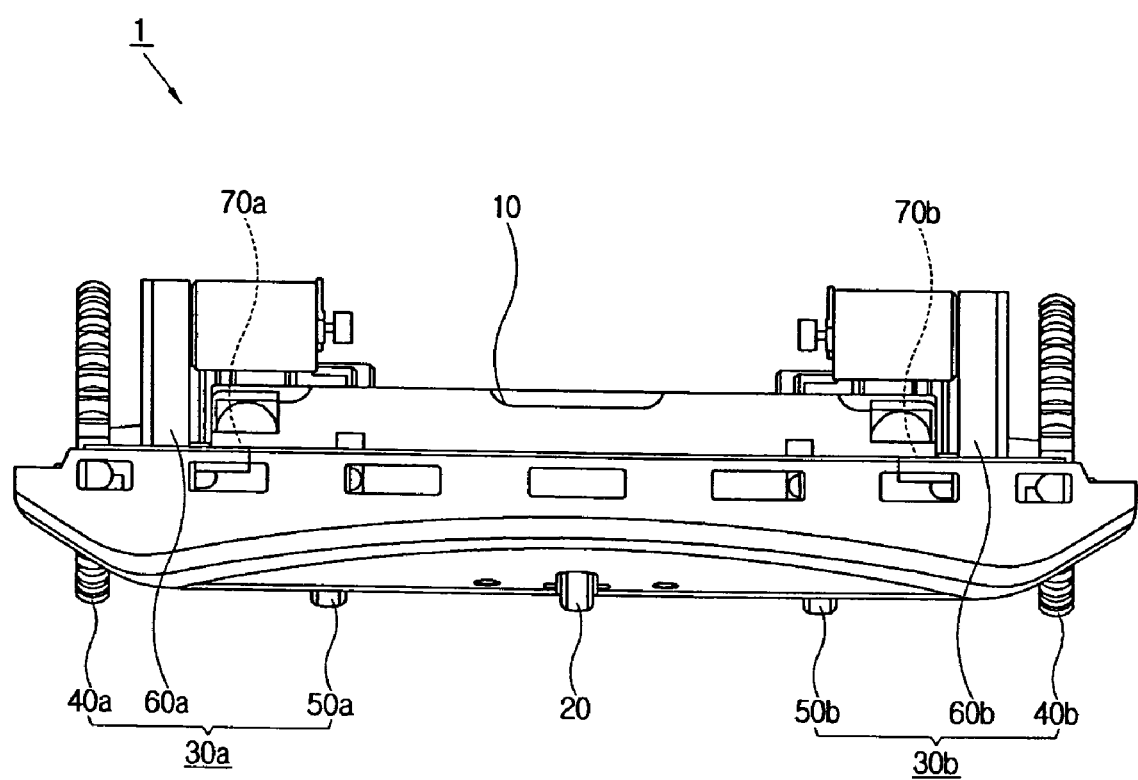
FIG. 3 is a front view illustrating the traveling robot in FIG. 2.

FIG. 2 is perspective view illustrating a traveling robot 1 according to an embodiment of the present general inventive concept, and FIG. 3 is a front view illustrating the traveling robot in FIG. 2.

As illustrated in FIGS. 2 and 3, the traveling robot 1 includes a main body frame 10, a front wheel 20, a first traveling part 30a, a second traveling part 30b, a first interlocking hinge part 70a, and a second interlocking hinge part 70b. The traveling robot 1 may be a cleaning robot including a cleaning part (not shown) provided to the main body frame 10 to clean a traveling surface, a displaying robot including a displaying part (not shown) provided thereto, or other robots performing other functions operations.

The front wheel 20 is supported to a front side of the main body frame 10 in a traveling direction "d." One front wheel 20 is disposed, but alternatively, a plurality of the front wheels 20 may be disposed along a perpendicular direction with respect to the traveling direction "d." The front wheel 20 may have a steering function.

The first traveling part 30a includes a first driving wheel 40a to travel the traveling direction "d," a first rear wheel 50a disposed inside and in a rear side of the first driving wheel 40a, and a first wheel frame 60a to support the first driving wheel 40a and the first rear wheel 50a. The second traveling part 30b includes a second driving wheel 40b to travel in the traveling direction "d" independently with respect to the first driving wheel 40a, a second rear wheel 50b disposed inside and in a rear side of the second driving wheel 40b, and a second wheel frame 60b to support the second driving wheel 40b and the second rear wheel 50b. The first traveling part 30a and the second traveling part 30b are disposed respectively in opposite sides of the main body frame 10. The first traveling part 30a and the second traveling part 30b may move the traveling robot1 in the opposite direction to the traveling direction "d."

The first interlocking hinge part 70a rotatably supports the first wheel frame 60a to the main body frame 10 to have a hinge axis of a perpendicular direction "p" with respect to the traveling direction "d," that is, the same direction as a shaft direction of the first driving wheel 40a. Accordingly, the first wheel frame 60a rotates about the first interlocking hinge part 70a with respect to the main body frame 10 according to a state of the traveling surface on which the traveling robot 1 travels, and thus, the first driving wheel 40a and the first rear wheel 50a may rotates together with the first wheel frame 60a, and to thereby interlock each other.

The second interlocking hinge part 70b rotatably supports the second wheel frame 60b to the main body frame 10 independently with respect to the first interlocking hinge part 70a to have a hinge axis of the same direction as the first interlocking hinge part 70a. Accordingly, the second wheel frame 60b rotates about the second interlocking hinge part 70b with respect to the main body frame 10 according to the state of the traveling surface on which the traveling robot 1 travels, and thus, the second driving wheel 40b and the second rear wheel 50b may rotate together with the second wheel frame 60b, and to thereby interlock each other.

The first interlocking hinge part 70a and the second interlocking hinge part 70b rotate the first wheel frame 60a and the second wheel frame 60b with respect to the main body frame 10 respectively and independently. The first interlocking hinge part 70a and the second interlocking hinge part 70b are separated from each other so that they rotate independently. Also, the first driving wheel 40a and the second driving wheel 40b drive independently. Accordingly, in the case that the first traveling part 30a and the second traveling part 30b respectively travel on traveling surfaces of different levels, the first interlocking hinge part 70a and the second interlocking hinge part 70b may rotate respectively to be suitable to the corresponding traveling surface, and thus, the first traveling part 30a and the second traveling part 30b can travel on the corresponding traveling surface smoothly. That is, the traveling surface may include a first traveling surface along which the first driving wheel 40a moves, and a second traveling surface along which the second driving wheel 40b moves, so that the traveling robot 1 moves along the direct "d."

The first interlocking hinge part 70a and the second interlocking hinge part 70b are disposed respectively in the main body frame 10 for the respective hinge axes thereof to be disposed in the same line. However, alternatively, the first interlocking hinge part 70a and the second interlocking hinge part 70b may be disposed in different portions of the main body frame 10 as long as the hinge axes thereof have the perpendicular direction with respect to the traveling direction "d."

The first traveling part 30a and the second traveling part 30b are symmetrical with respect to the traveling direction "d." That is, the first driving wheel 40a and the second driving wheel 40b, the first rear wheel 50a and the second rear wheel 50b, and the first wheel frame 60a and the second wheel frame 60b are respectively symmetrical with respect to a center line along the traveling direction "d" of the traveling robot. However, alternatively, the first traveling part 30a and the second traveling part 30b may not be symmetrical. The first traveling surface and the second traveling surface may be disposed opposite sides of the center line of the traveling direction "d."

The first interlocking hinge part 70a and the second interlocking hinge part 70b may be disposed within a predetermined distance from a weight center of the traveling robot 1 in the traveling direction "d." That is, a the weight center of the traveling robot 1 may be disposed adjacent to a position in which the first interlocking hinge part 70a and the second interlocking hinge part 70b are disposed to the main body frame 10. Accordingly, traction forces of the first driving wheel 40a and the second driving wheel 40b against the traveling surface can increase. Also, when the first interlocking hinge part 70a and the second interlocking hinge part 70b rotate with respect to the main body frame 10 as the traveling robot 1 travels on an uneven surface, variation of the weight center of the traveling robot 1 can be minimized for the first driving wheel 40a and the second driving wheel 40b to maintain the sufficient traction force against the traveling surface. Also, the main body frame 10 can be prevented from shaking, and thus, a traveling ability of the traveling robot 1 can be enhanced.

The first interlocking hinge part 70a and the second interlocking hinge part 70b may be disposed in a rear position in the traveling direction "d" from the weight center of the traveling robot 1. That is, the weight center thereof may a disposed in front of the position in which the first interlocking hinge part 70a and the second interlocking hinge part 70b are disposed to the main body frame 10. However, alternatively, the first interlocking hinge part 70a and the second interlocking hinge part 70b may be disposed in front of the weight center of the traveling robot 1.

Alternatively, the traveling robot 1 may include at least three traveling parts arranged along the perpendicular direction with respect to the traveling direction "d," and at least three interlocking hinge parts to support the corresponding traveling part to the main body frame 10 respectively. Here, the traveling parts and the interlocking hinge parts drive independently and respectively.

Hereinafter, a portion of the traveling robot 1 according to the present embodiment will be described by referring to FIGS. 2 to 5. For convenience, the first traveling part 30a and the second traveling part 30b are referred to as a traveling part 30, the first driving wheel 40a and the second driving wheel 40b as a driving wheel 40, the first rear wheel 50a and the second rear wheel 50b as a rear wheel 50, the first wheel frame 60a and the second wheel frame 60b as a wheel frame 60, and the first interlocking hinge part 70a and the second interlocking hinge part 70b as interlocking hinge part 70.

Figure 4:
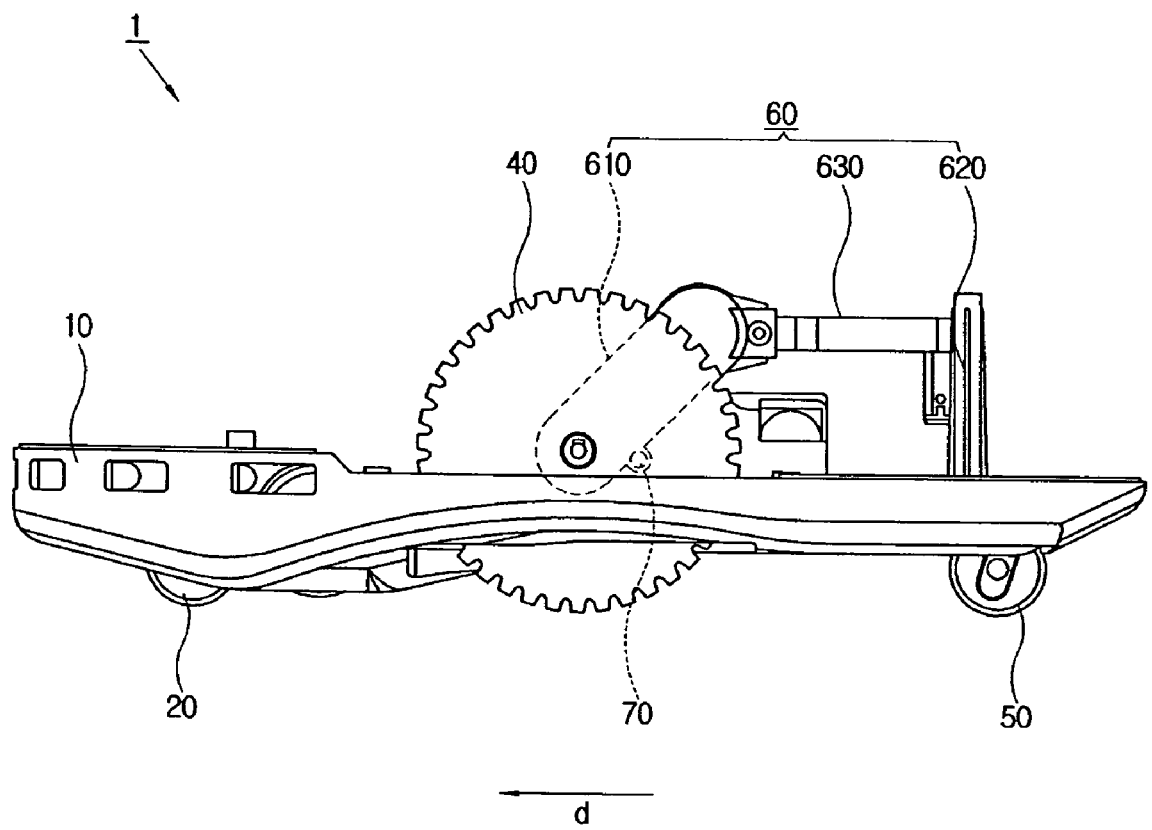
FIG. 4 is a side view illustrating the traveling robot in FIG. 2.
Figure 5:
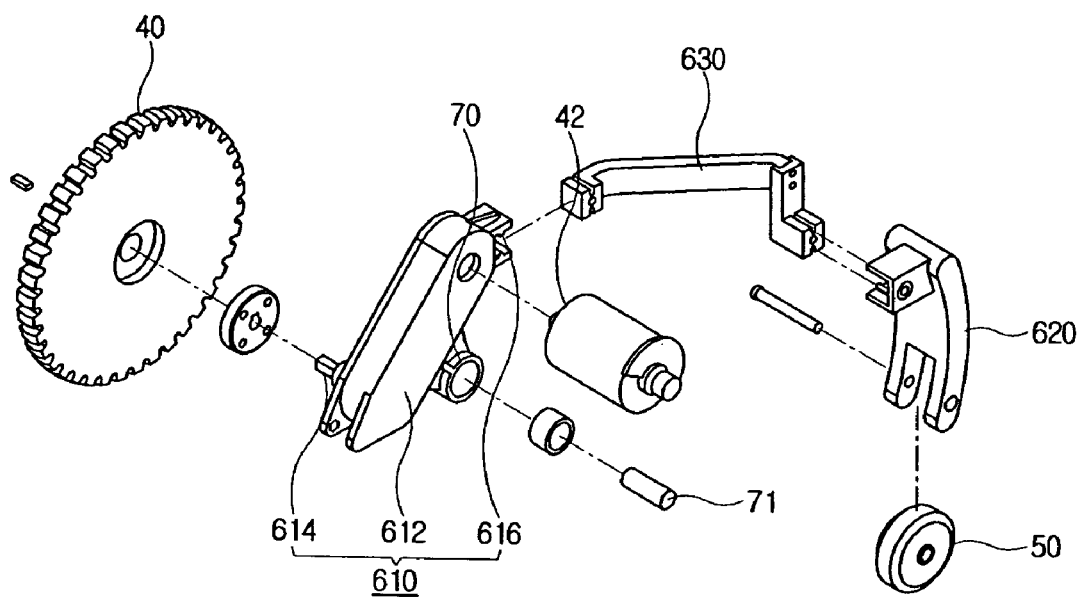
FIG. 5 is an exploded perspective view illustrating a portion of the traveling robot in FIG. 2.

FIG. 4 is a side view illustrating the traveling robot 1 in FIG. 2, and FIG. 5 is an exploded perspective view illustrating a portion of the traveling robot 1 in FIG. 2. As illustrated in FIGS. 4 and 5, the wheel frame 60 includes a main frame 610 to support the driving wheel 40, a sub frame 620 to support the rear wheel 50, and a linking member 630 to link the main frame 610 with the sub frame 620.

The main frame 610 includes a driving shaft part 614 to support the driving wheel 40, a frame body 612 extending upward and backward in the traveling direction "d" from the driving shaft part 614, and a coupling part 616 coupled with the linking member 630. The coupling part 616 couples the linking member 630 to the main frame 610 so that the linking member 630 may move together with the main frame 610. A driving motor 42 is disposed in a portion of the frame body 612 to drive the driving wheel 40. The main frame 610 may be provided as a gear box to interlock the driving motor 42 with the driving wheel 40. The linking member 630 and the sub frame 620 are coupled each other to move together. Thus, the wheel frame 60 can rotate about the interlocking hinge part 70 with respect to the main body frame 10.

The interlocking hinge part 70 is disposed in the frame body 612 disposed downward and forward in the traveling direction "d" from the coupling part 616. That is, the interlocking hinge part 70 is disposed adjacent to the driving shaft part 614 connected to the driving wheel 40 and is rotatably connected to the main body frame 10 through a shaft 71. A rotation radius of the driving wheel 40 with respect to the interlocking hinge part 70 is I smaller than that of the rear wheel 50 with respect to the interlocking hinge part 70. That is, a distance between the driving wheel 40 and the interlocking hinge part 70 is shorter then a distance between the interlocking hinge part 70 and rear wheel 50. Accordingly, the traction force of the driving wheel 40 can increase.

Hereinafter, an operation of the traveling robot 1 according to the present general invention concept will described by referring to FIGS. 6A to 7.

Figure 6A:
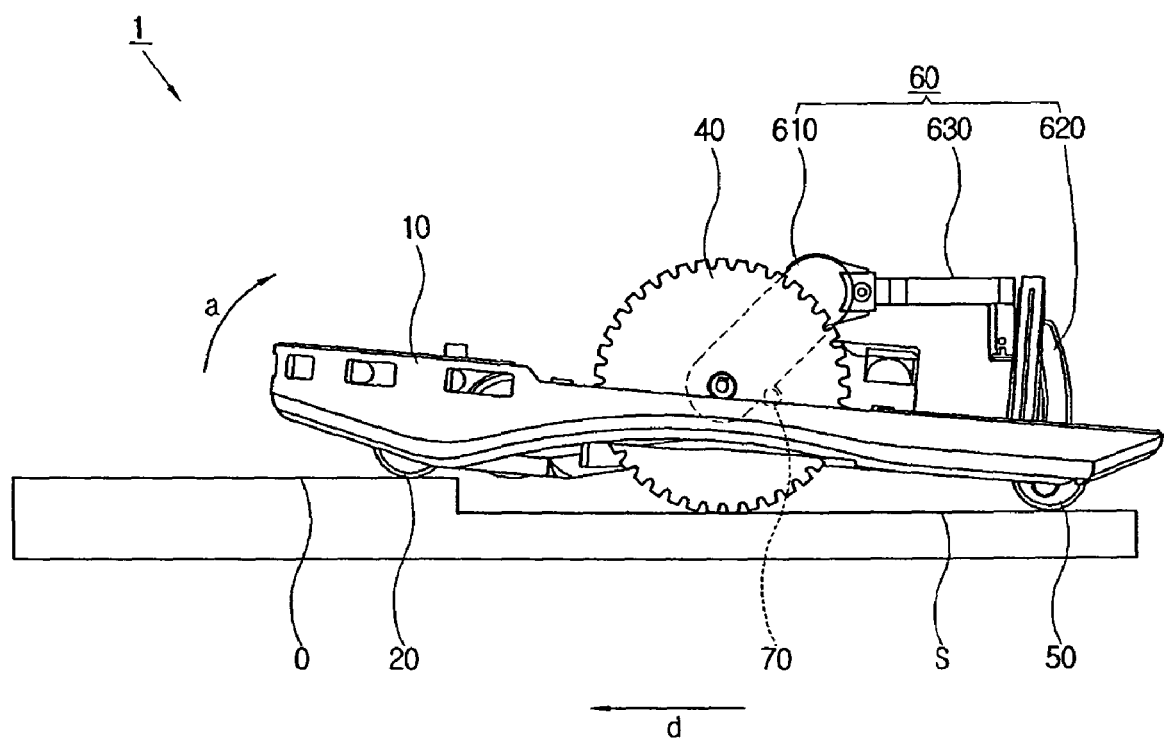
FIGS. 6A and 6B are side views illustrating traveling states of the traveling robot in FIG. 2.
Figure 6B:
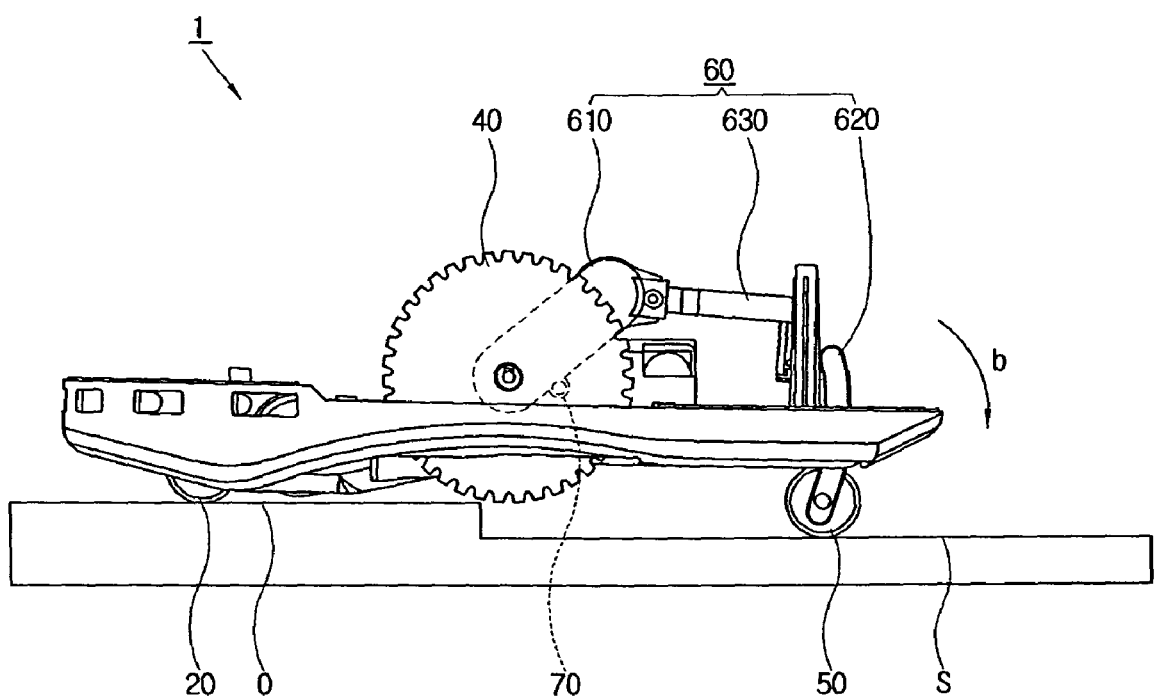

FIGS. 6A and 6B are side views illustrating traveling states of the traveling robot 1 in FIG. 2. As illustrated in FIGS. 6A and 6B, the traveling robot 1 travels on a traveling surface S formed along a traveling direction "d" and a stair surface O having a stair protruding from the traveling surface S. The traveling robot 1 travels along the traveling direction "d", the front wheel 20 climbs on the stair surface O. At this time, the main body frame 10 rotates about the interlocking hinge part 70 with respect to the wheel frame 60 in a direction "a." Thus, the driving wheel 40 and the rear wheel 50 can support the main body frame 10 to the traveling surface S, and the driving wheel 40 can maintain the sufficient traction force.

As illustrated in FIG. 6B, as the traveling robot 1 further travels along the traveling direction "d," the driving wheel 40 climbs on the stair surface O, and the rear wheel 50 remains on the traveling surface S. At this time, the wheel frame 60 rotates about the interlocking hinge part 70 with respect to the main body frame 10 in a direction "b." Thus, the rear wheel 50 may additionally protrude toward the traveling surface S from the main body frame 10 to contact the traveling surface S and to support the main body frame 10 with the driving wheel 40 against the traveling surface S. Also, the front wheel 20 can maintain contact the stair surface O. The driving wheel 40 may maintain the sufficient traction force because a weight center of the traveling robot 1 is disposed around the interlocking hinge part 70 adjacent to the driving wheel 40.

Figure 7:
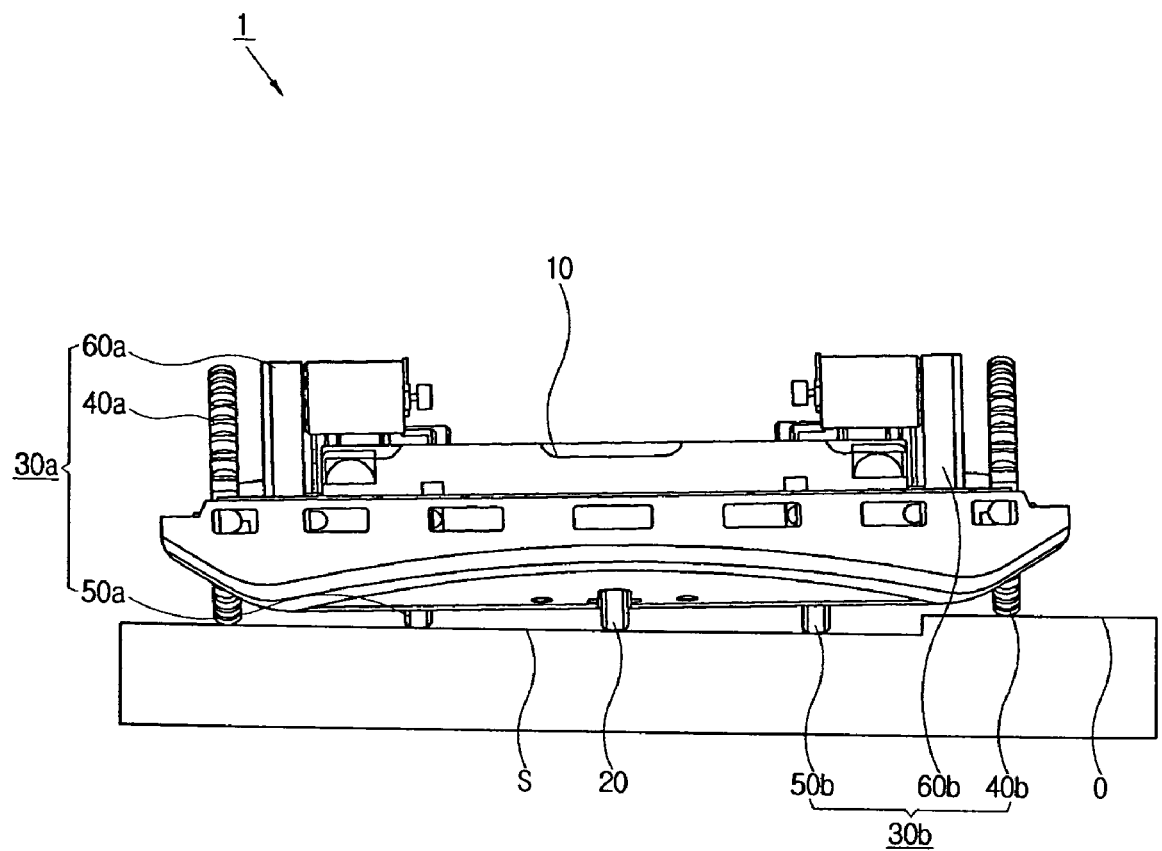
FIG. 7 is a front view illustrating another traveling state of the traveling robot in FIG. 2.

FIG. 7 is a front view illustrating another traveling state of the traveling robot 1 in FIG. 2. Referring to FIGS. 2, 3 and 4 the driving wheels 40a and 40b travel respectively on traveling surfaces of different levels. The first driving wheel 40a travels on a traveling surface S, and the second driving wheel 40b travels on a stair surface O formed with a stair rising from the traveling surface S.

The first interlocking hinge part 70a and the second interlocking hinge part 70b rotate independently each other, so that the first traveling part 30a and the second traveling part 30b may respectively travel properly to the traveling surface S and the stair surface O. The first driving wheel 40a and the second driving wheel 40b can maintain the sufficient traction force respectively, and the front wheel 20 can maintain contact the traveling surfaces, and to thereby prevent sliding. Also, the first rear wheel 50a and the second rear wheel 50b can contact the traveling surface S and the stair surface O respectively, and to thereby support the main body frame 10 stably.

Figure 8:
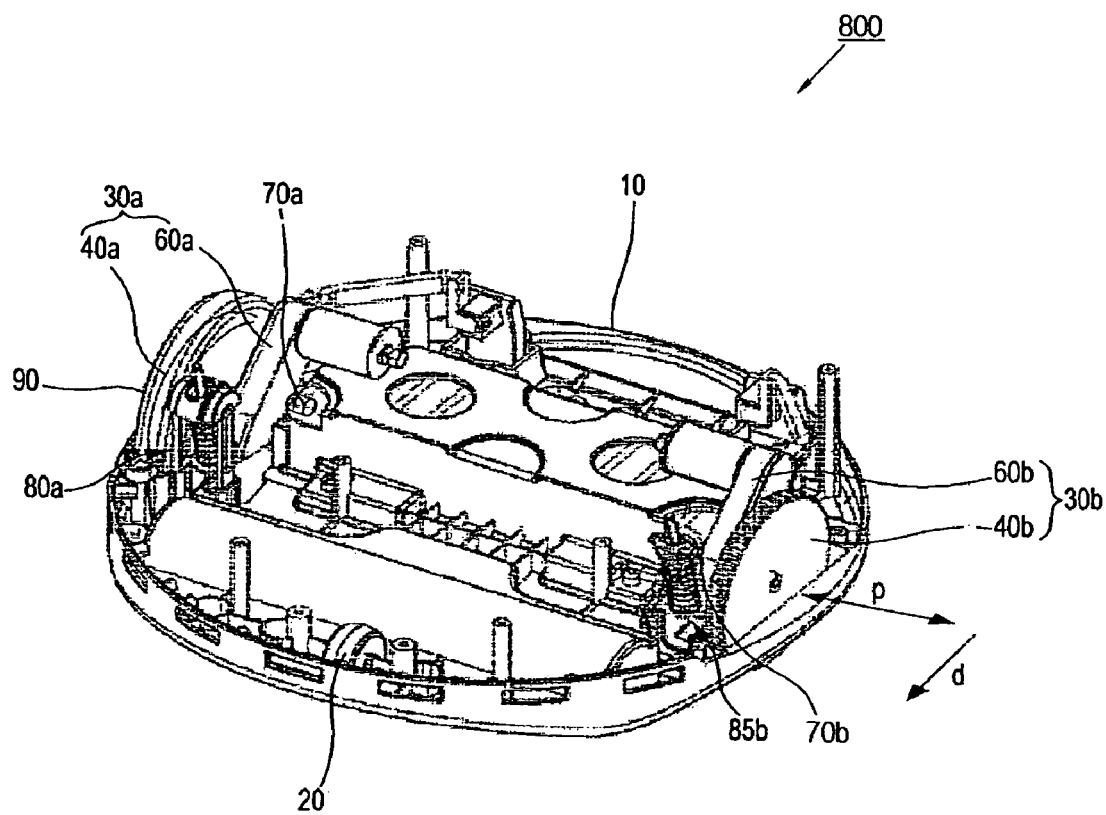
FIG. 8 is a perspective view illustrating a traveling robot according to an embodiment of the present general inventive concept.
Figure 9:
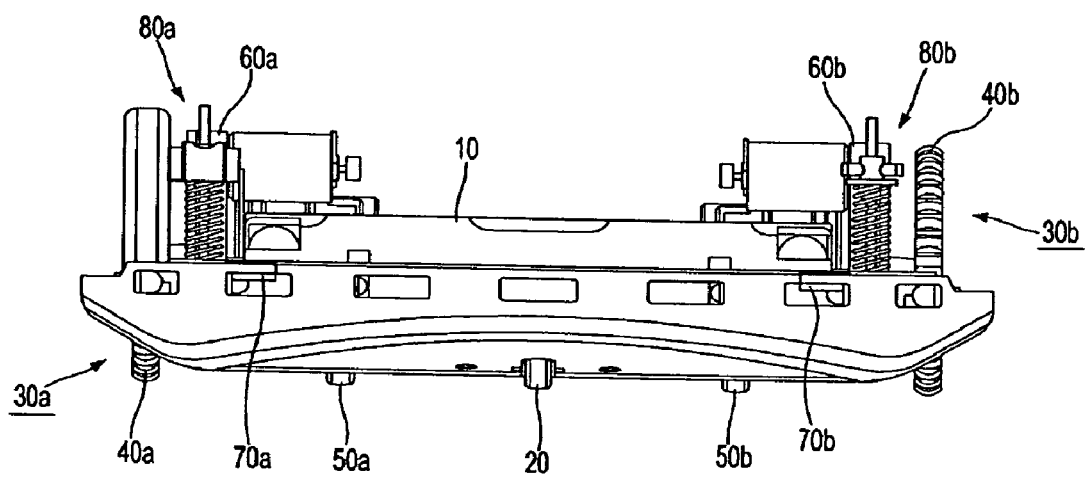
FIG. 9 is a front view illustrating the traveling robot in FIG. 8.
Figure 10:
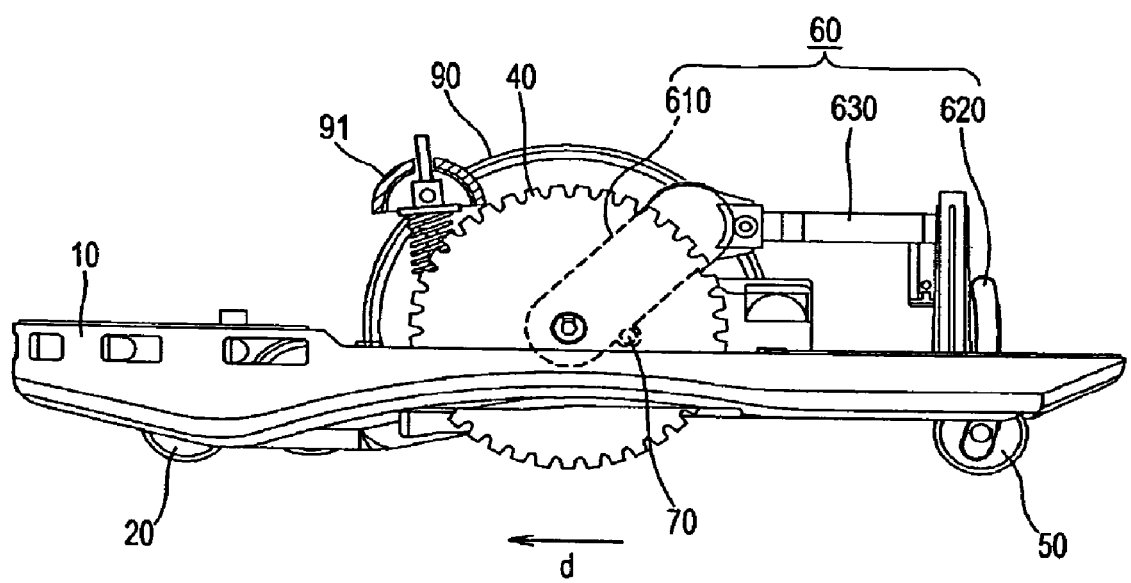
FIG. 10 is a side view illustrating the traveling robot in FIG. 8.

FIG. 8 is a perspective view illustrating a traveling robot 800 according to an embodiment of the present general inventive concept, and FIG. 9 is a front view illustrating the traveling robot in FIG. 8.

As illustrated in FIGS. 8 and 9, the traveling robot 80a includes a main body frame 10, a front wheel 20, a first traveling part 30a, a second traveling part 30b, a first interlocking hinge part 70a, a second interlocking hinge part 70b, a first suspension part 80a, and a second suspension part 80b. According to the present embodiment, the traveling robot 1 comprises the first and second suspension parts 80a and 80b and a wheel cover 90. Thus, repetitive descriptions will be avoided the embodiment of FIG. 8 is similar to the embodiment of FIG. 2.

The first suspension part 80a allows a first driving wheel 40a to rotate with respect to the first interlocking hinge part 70a to come into maximum contact with a traveling surface. That is, the first suspension part 80a is placed between the main body frame 10 and a first wheel frame 60a, so that the first driving wheel 40a is elastically biased toward the traveling surface. The first suspension part 80a may be placed inside the first driving wheel 40a and in front of the first wheel frame 60a without obstructing the first driving wheel 40a.

The second suspension part 80b allows a second driving wheel 40b to rotate with respect to the second interlocking hinge part 70b independently from the first interlocking hinge part 70a to come into maximum contact with the traveling surface. That is, the second suspension part 80b is placed between the main body frame 10 and a second wheel frame 60b so that the second driving wheel 40b is elastically biased toward the traveling surface. The second suspension part 80b may be placed inside the second driving wheel 40b and in front of the second wheel frame 60b without obstructing the second driving wheel 40b.

Hereinafter, a portion of the traveling robot 80a according to the present embodiment will be described by referring to FIGS. 8 to 11. The first and second traveling parts 30a and 30b may be symmetrical to each other. For convenience, in FIG. 9, the first traveling part 30a and the second traveling part 30b are referred to as a traveling part 30, the first driving wheel 40a and the second driving wheel 40b are referred to as a driving wheel 40, the first rear wheel 50a and the second rear wheel 50b are referred to as a rear wheel 50, the first wheel frame 60a and the second wheel frame 60b are referred to as a wheel frame 60, the first interlocking hinge part 70a and the second interlocking hinge part 70b are referred to as a interlocking hinge part 70, and the first suspension part 80a and the second suspension part 80b are referred to as a suspension part 80.

Figure 11:
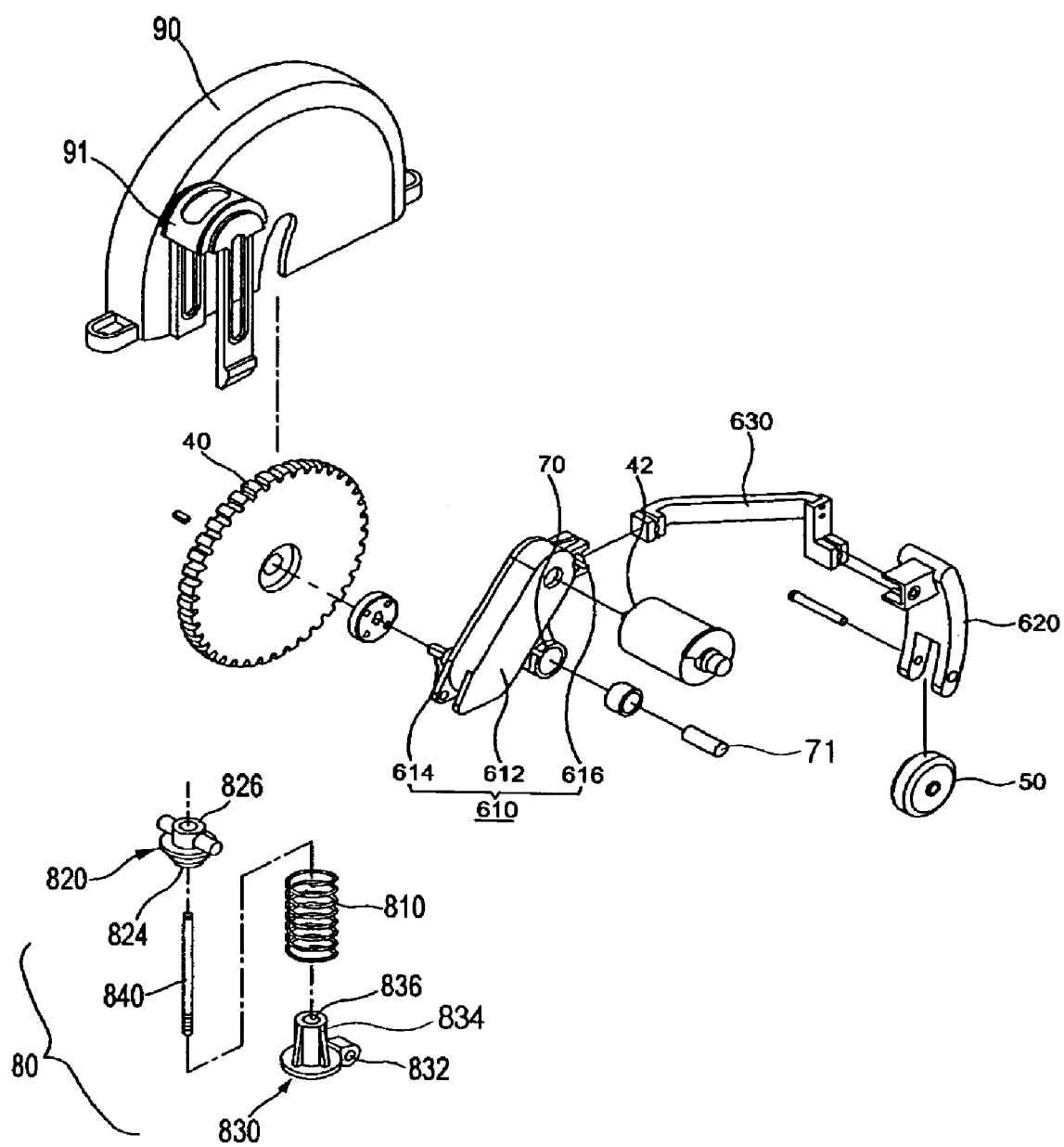
FIG. 11 is an exploded perspective view illustrating a portion of the traveling robot in FIG. 8.

Referring to FIG. 11 the suspension part 80 comprises an elastic member 810, and upper and lower holders 820 and 830 to hold the elastic member 810 at opposites of the elastic member 810. The upper holder 820 is coupled to the main body frame 10 by a bracket cover 91 provided in wheel cover 90 of protecting the driving wheel 40.

The bracket cover 91 is formed on an inward surface of the wheel cover 90, so that the bracket cover 91 is not only placed in front of a main frame 610 but also spaced apart from the lower holder 830 at a predetermined distance.

The lower holder 830 is rotatably coupled to the main frame 610 by a hinge unit 832. The hinge unit 832 is connected to a hinge shaft 614' of the main frame 610. The lower holder 830 is connected to one side of the main frame 610 formed with a driving shaft part 614 connected to the driving wheel 40. That is, the interlocking hinge part 70 is disposed in a middle of the main frame 610, and the suspension part 80 is provided in an end part of the main frame 610 where the hinge shaft 614' is formed. Accordingly, the suspension part 80 is disposed the main body frame 10 to be spaced apart from the driving shaft part 614, thereby making the driving wheel 40 come into maximum contact with the traveling surface or the stair surface. Since an elastic force of the elastic number 810 of the suspension part 80 is applied to the hinge 614', the main frame 610 is biased to rotate the driving shaft 614 with respect to the interlocking hinge port 70, so that the driving wheel 40 is pressed downward.

The elastic member 810 is shaped like a coil. The elastic member 810 has a first end coupled to a second supporting projection 824 protruding downward from the upper holder 820, and a second end coupled to a supporting projection 834 protruding upward from the lower holder 830.

Further, a guide shaft 840 is provided between the upper holder 820 and the lower holder 830 along a stretching direction of the elastic member 810. The guide shaft 840 has a first end inserted in and coupled to the second holder 830 through a coupling hole 836 formed in the supporting projection 834 of the lower holder 830, and a second end supported in a through hole 826 of the upper holder 820, so that the elastic member 810 is not bent while being compressed between the upper and lower holders 820 and 830.

In the present embodiment, the upper holder 820 is supported by the bracket cover 91 of the wheel cover 90, but not limited thereto. Alternatively, the bracket cover 91 and the main body frame may be formed as a single body, in which the bracket cover 91 protrudes from the main body frame and faces the lower holder 830 at a predetermined distance from the lower holder 830.

Hereinafter, an operation of the traveling robot 800 according to the present general inventive concept will described by referring to FIGS. 12A and 12B.

Figure 12A:
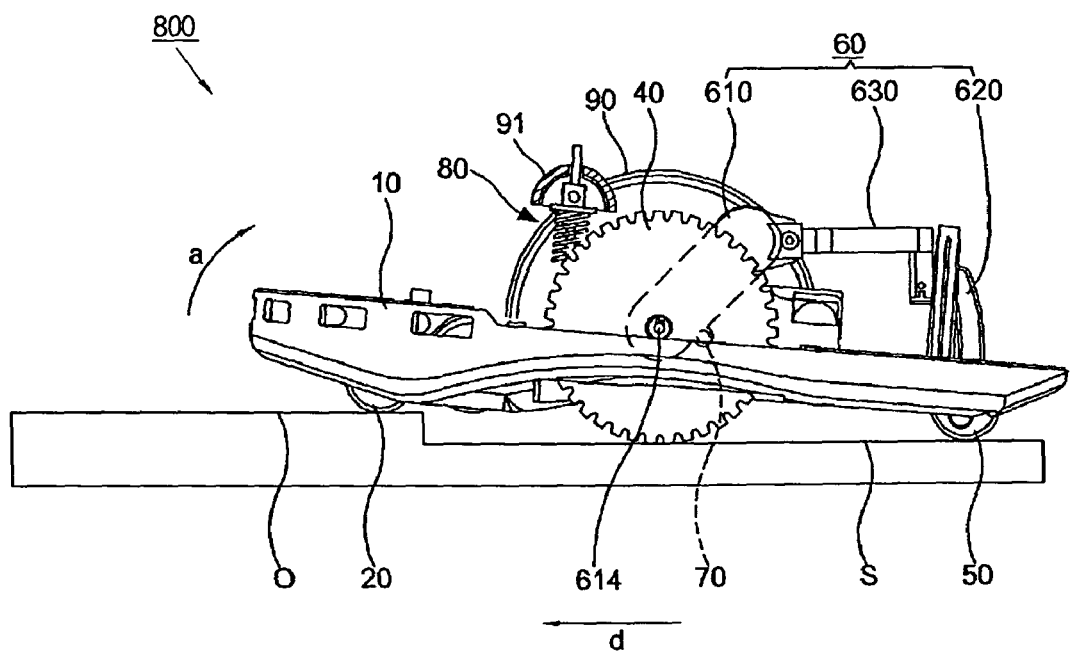
FIGS. 12A and 12B are side views illustrating traveling states of the traveling robot in FIG. 9.
Figure 12B:
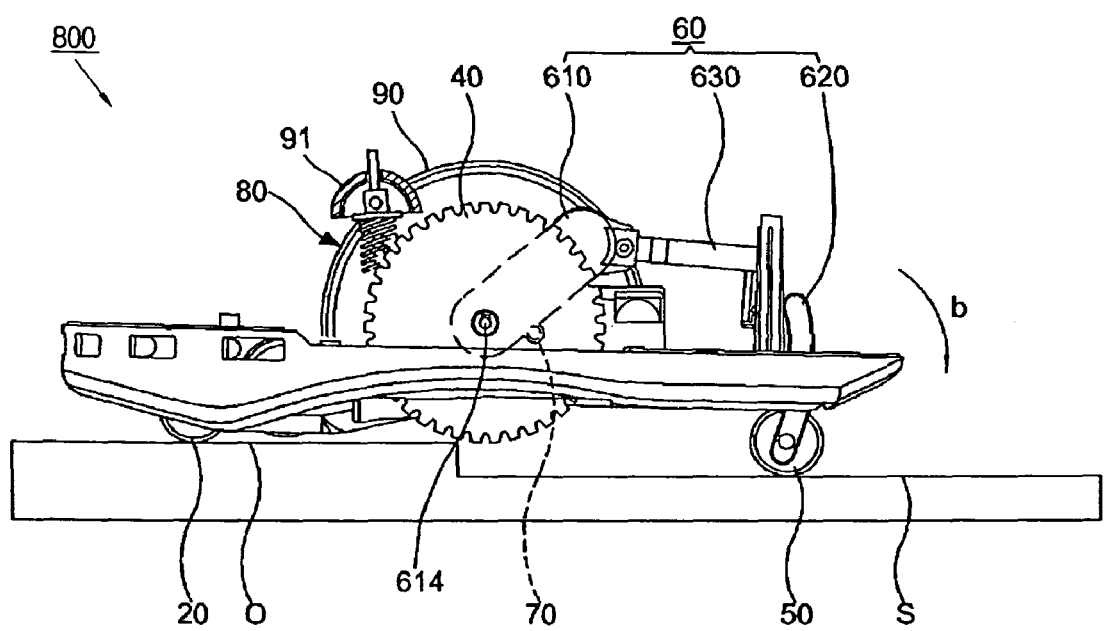

FIGS. 12A and 12B are side views illustrating traveling states of the traveling robot 800 in FIGS. 8 and 9. As illustrated in FIGS. 12A and 12B, the traveling robot 800 travels on a traveling surface S formed along a traveling direction "d" and a stair surface O having a stair from the traveling surface S.

As illustrated in FIG. 12A, as the traveling robot 800 travels along the traveling direction "d," the front wheel 20 climbs on the stair surface O. At this time, the wheel frame 610 comprising the driving shaft part 614 is elastically biased by the elastic member 810 of the suspension part 80. Accordingly, the driving wheel 40 is elastically urged to come into maximum contact with the traveling surface S by the elastic member 810 while rotating with respect to the interlocking hinge part 70.

As illustrated in FIG. 12B, as the traveling robot 1 further travels along the traveling direction "d," the driving wheel 40 climbs on the stair surface O, and the rear wheel 50 remains on the traveling surface S. At this time, the driving wheel 40 is elastically urged to come into maximum contact with the traveling surface S by the elastic member 810 while rotating with respect to the interlocking hinge part 70.

Figure 13:
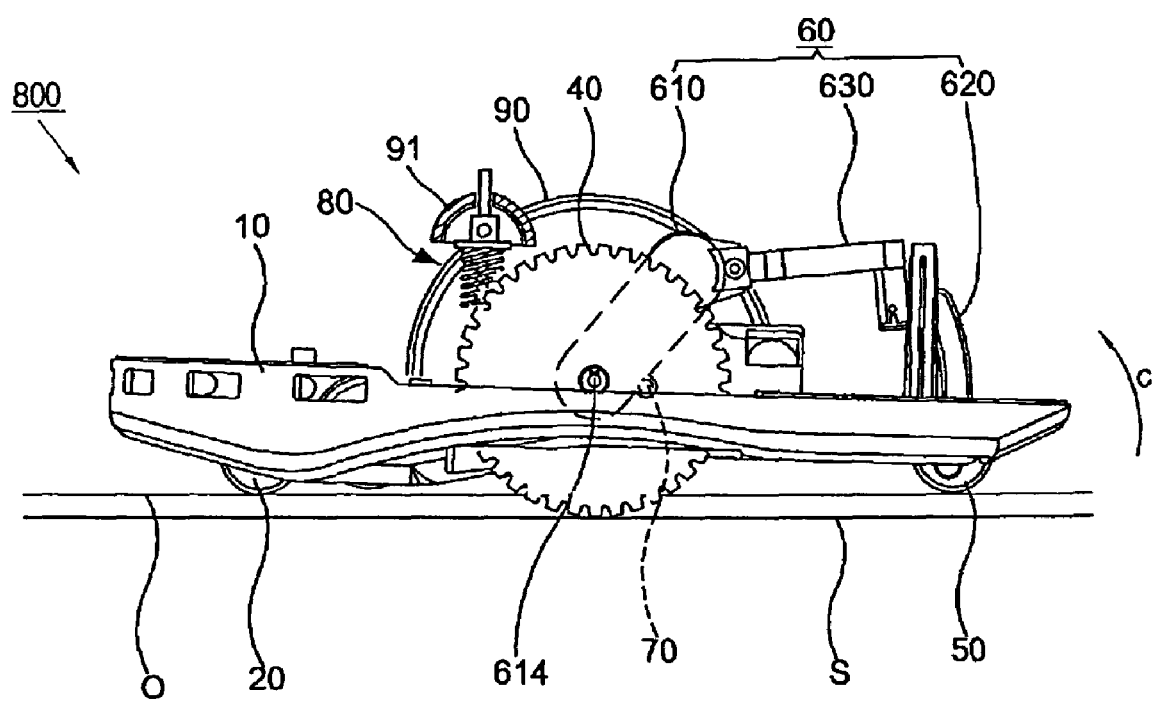
FIG. 13 is a side view illustrating a third traveling state of the traveling robot in FIG. 9.

FIG. 13 is a side view illustrating another traveling state of the traveling robot 800 in FIG. 8. Referring to FIGS. 8-13, a front wheel 20 and a rear wheel 50 of the traveling robot 800 travel on the stair surface O, but the driving wheel 40 travels on the traveling surface S. At this time, the wheel frame 60 rotates about the interlocking hinge part 70 with respect to the main body frame 10 in a direction "c.") Thus, the driving wheel 40 may additionally protrude toward the traveling surface S from the main body frame 10 to contact the traveling surface S. In this case, a weight of the main body frame 10 is properly distributed to the front wheel 20, the driving wheel 40, and the rear wheel 50, so that the driving wheel 40 may decrease in ability to be biased or pressed to the traveling surface S. However, because the wheel frame 610 having the driving shaft part 614 is elastically biased by the elastic member 810 of the suspension part 80, the driving wheel 40 is further urged to come into maximum contact with the traveling surface S by the elastic member 810 with respect to the interlocking hinge part 70.

As described above, the traveling robot according to the present general inventive concept can maintain the sufficient traction force of the driving wheel and minimize shaking of the traveling robot, and thereby enhancing the traveling ability thereof on the uneven surface formed with the stair or the like, since the driving wheel and the rear wheel interlock each other and the opposite traveling parts drive independently to be suitably adapted to the surface.

Further, the suspension part is provided between the main body and the driving wheel, so that the driving wheel is elastically biased toward the traveling surface, thereby allowing the driving wheel to have the maximum ability to be stuck to the ground regardless of whether the weight center of the traveling robot moves or not.

Also, the elastic member of the suspension part absorbs a shock of the driving wheel colliding with the traveling surface after climbing the stair surface, thereby protecting internal elements of the main body.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A traveling robot comprising:
   a main body frame having a front wheel supported in a front portion thereof in a traveling direction;
   a first traveling part having a first driving wheel to drive the main body frame wheel driving in the traveling direction, a first rear wheel disposed in a rear side of the first driving wheel, and a first wheel frame to interlockably support the first driving wheel and the first rear wheel;
   a second traveling part having a second driving wheel to drive the main body frame in the traveling direction independently from the first driving wheel, a second rear wheel disposed in a rear side of the second driving wheel, and a second wheel frame to interlockably support the second driving wheel and the second rear wheel;
   a first interlocking hinge having a hinge axis of a perpendicular direction with respect to the traveling direction, to support the first wheel frame such that the first wheel frame rotates with respect to the main body frame or the main body frame rotates with respect to the first wheel frame; and
   a second interlocking hinge part having a hinge axis of the same direction as the first interlocking hinge part, to support the second wheel frame such that the second wheel frame rotates with respect to the main body frame or the main body frame rotates with respect to the second wheel frame independently from the first interlocking hinge part.

2. The traveling robot according to claim 1, wherein the first interlocking hinge part and the second interlocking hinge part are disposed to the main body frame through the first and second hinge axes respectively, and the first and second axes are disposed on a same line.

3. The traveling robot according to claim 2, wherein the first traveling part and the second traveling part are symmetrical with respect to the traveling direction.

4. The traveling robot according to claim 3, wherein the first wheel frame and the second wheel frame comprise:
   main frames to respectively support the first driving wheel and the second driving wheel, sub frames to respectively support the first rear wheel and the second rear wheel, and linking members to respectively link the main frames with the sub frames.

5. The traveling robot according to claim 4, wherein the main frames comprise driving shaft parts to respectively support the first driving wheel and the second driving wheel, frame bodies respectively extending upward and backward in the traveling direction from the driving shaft parts, and coupling parts respectively coupled with the linking members.

6. The traveling robot according to claim 3, wherein the first interlocking hinge part and the second interlocking hinge part are disposed within a predetermined distance from a weight center of the traveling robot in the traveling direction.

7. The traveling robot according to claim 6, wherein the first wheel frame and the second wheel frame comprise:
   main frames to respectively support the first driving wheel and the second driving wheel, sub frames to respectively support the first rear wheel and the second rear wheel, and linking members to respectively link the main frames with the sub frames.

8. The traveling robot according to claim 7, wherein the main frames comprise driving shaft parts to respectively support the first driving wheel and the second driving wheel, frame bodies respectively extending upward and backward in the traveling direction from the driving shaft parts, and coupling parts respectively coupled with the linking members.

9. The traveling robot according to claim 6, wherein the first interlocking hinge part and the second interlocking hinge part are disposed backward in the traveling direction from the weight center of the traveling robot.

10. The traveling robot according to claim 9, wherein the first wheel frame and the second wheel frame comprise:
    main frames to respectively support the first driving wheel and the second driving wheel, sub frames to respectively support the first rear wheel and the second rear wheel, and linking members to respectively link the main frames with the sub frames.

11. The traveling robot according to claim 10, wherein the main frames comprise driving shaft parts to respectively support the first driving wheel and the second driving wheel, frame bodies respectively extending upward and backward in the traveling direction from the driving shaft parts, and coupling parts respectively coupled with the linking members.

12. A traveling robot comprising:
    a main body frame having a front wheel supported in a front portion thereof in a traveling direction;
    a plurality of traveling parts each of which comprises a driving wheel, a rear wheel disposed in a rear side of the driving wheel, and a wheel frame to connect and support the driving wheel and the rear wheel, and which are driven independently from each other;
    an interlocking hinge part to support the wheel frames of the respective traveling parts such that the wheel frames of the respective traveling parts rotates with respect to the main body frame or the main body frame rotates with respect to the wheel frames of the respective traveling parts, and
    a suspension part provided between the main body frame and the wheel frame to allow the driving wheel to be elastically biased toward a traveling surface.

13. The traveling robot according to claim 12, wherein:
    the wheel frame comprises a main frame to support the driving wheel, a sub frame to support the rear wheel, and a linking member to link the main frame with the sub frame;
    the interlocking hinge part is provided between opposite end parts of the main frame; and
    the suspension part is coupled to the main frame such that the driving wheel is disposed between the interlocking hinge part and the suspension part.

14. The traveling robot according to claim 13, wherein the main body frame comprises a bracket cover, and the suspension part comprises:
    an upper holder supported by the bracket cover provided in the main body frame;
    a lower holder rotatably supported by the main frame;
    an elastic member interposed between the upper and lower holders; and
    a guide shaft provided between the upper and lower holders along a stretching direction of the elastic member to prevent the elastic member from being bent.

15. The traveling robot according to claim 14, wherein the bracket cover protrudes from the main body frame and is spaced apart from the lower holder at a predetermined distance.

16. The traveling robot according to claim 14, wherein the main body frame comprises a wheel cover, and the bracket cover is provided in the wheel cover detachably coupled to the main body frame.

* * * * *